(No Model.)
C. S. SHARP.
WHIFFLETREE.
No. 513,286. Patented Jan. 23, 1894.
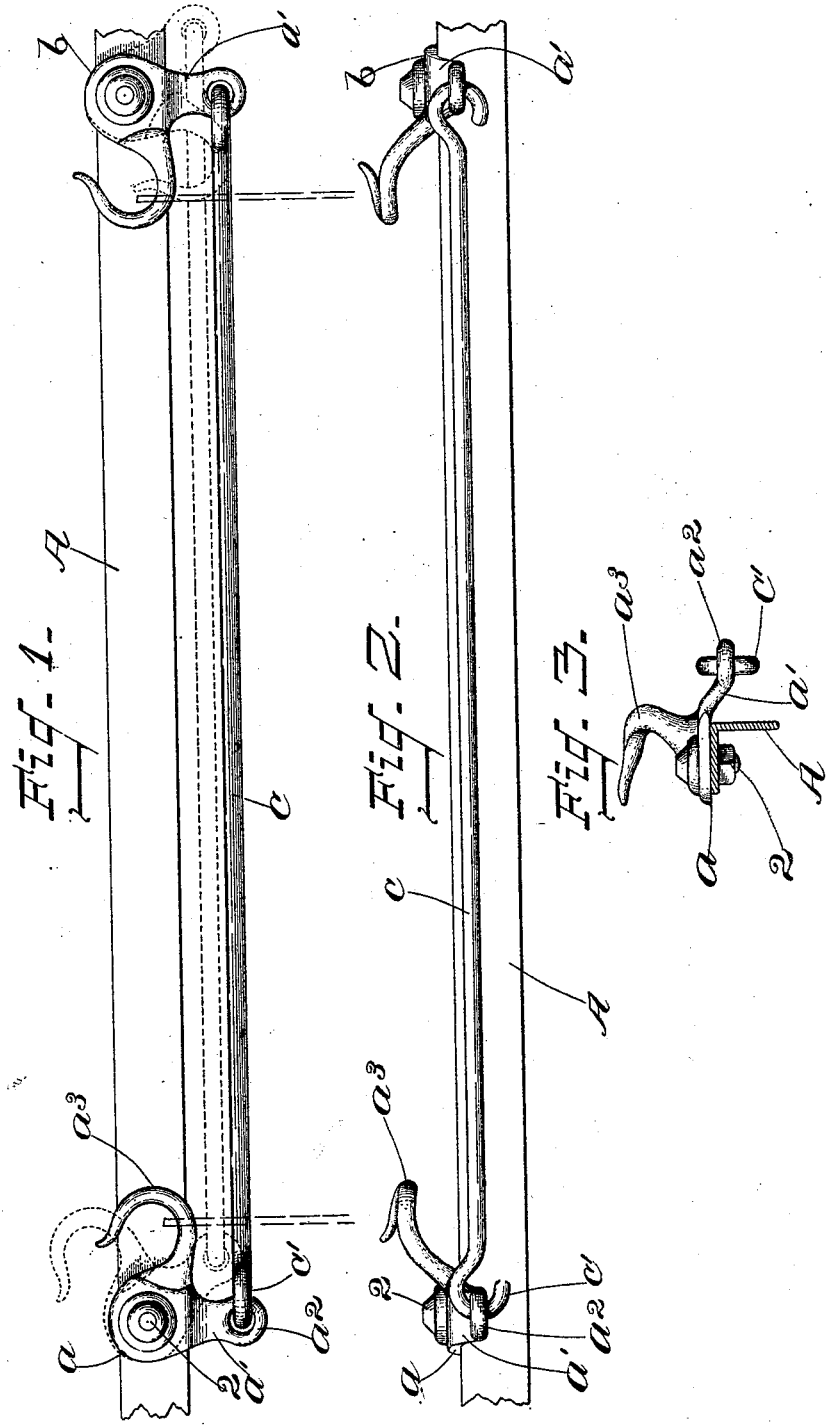

UNITED STATES PATENT OFFICE.

CHARLES S. SHARP, OF AUBURN, NEW YORK, ASSIGNOR TO THE D. M. OSBORNE & COMPANY, OF SAME PLACE.

WHIFFLETREE.

SPECIFICATION forming part of Letters Patent No. 513,286, dated January 23, 1894.

Application filed August 12, 1893. Serial No. 482,999. (No model.)

*To all whom it may concern:*

Be it known that I, CHARLES S. SHARP, of Auburn, county of Cayuga, State of New York, have invented an Improvement in Whiffle-trees, of which the following description, in connection with the accompanying drawings, is a specification, like letters and figures on the drawings representing like parts.

This invention has for its object to improve and simplify the construction of whiffle-trees whereby the same may be made entirely of metal, the necessity of safety catches avoided, and the parts so disposed as not to interfere with any device or devices which may be supported upon the draft frame to which the whiffle-tree is connected.

The whiffle-tree consists essentially of the two bell-crank levers, made rights and lefts and pivoted to the draft-bar, and so disposed thereon that each presents a forwardly projecting arm, and an inwardly projecting arm, the forwardly projecting arms being offset and connected together in advance of the draft or supporting frame by a connecting rod, and the inwardly projecting arms extending upward diagonally to the draft bar and bent at the ends to form hooks, to which the traces are attached, thereby supporting said traces above and free from contact with the draft bar and connecting rod over which they pass; and my invention consists in details of construction and arrangement of the several parts thereof, as will be hereinafter pointed out.

Figure 1— shows in plan view a whiffle-tree embodying this invention; Fig. 2— a front elevation of the whiffle-tree shown in Fig. 1— and Fig. 3— an end view.

A represents the supporting frame or draft-bar to which the whiffle-tree is or may be attached. Two bell-crank levers $a$, $b$, made rights and lefts, are each provided with holes for the pivot bolt 2, by means of which said levers are pivoted to the draft-bar. One arm of each bell-crank lever, as $a'$, is extended forward, and bent downwardly or offset as shown, and has formed at its end an eye $a^2$, and said arms $a'$ of both levers are continuously in parallelism. The other arm, as $a^3$, of each bell-crank lever is curved to form a hook, and said hook-shaped arms $a^3$, project inwardly toward each other, and also upwardly, diagonally to the draft bar. See Figs. 1— and 2. A connecting rod, $c$, having a hook $c'$ at each end, engages the eyes $a^2$, of the bell-crank levers in advance of and in parallelism with the draft-bar A, continuously maintaining the arms $a'$ thereof in parallelism notwithstanding the pivotal movements of the levers, and hence moving the hook-shaped arms $a^3$, in opposite directions, tending to equalize the draft.

By placing the connecting rod in advance of the draft-bar or frame A, as shown, said frame may be utilized to support other parts, which would interfere with the working of the whiffle-tree, if said connecting rod was arranged at the rear side of said frame.

The upward bend given to the hook-shaped arms $a^3$, is sufficient to enable the traces to be connected therewith, see dotted lines Fig. 1, and not interfere with the draft-bar A. As the connecting rod $c$ is located in front of said arms $a^3$, to prevent the traces from rubbing on said rod it must be supported below the upper surface of the draft bar, or not above a point flush with said upper surface, and by offsetting the arms $a'$ as shown, this result is accomplished; also it will be seen that by offsetting said arms $a'$ as shown, the movement of the bell-crank levers on their pivots is limited, as the shoulders formed by offsetting strike against the front face of the draft-bar. This is particularly advantageous when turning corners. By turning the hook-shaped arms $a^3$, inwardly as shown, the traces when connected therewith, cannot be accidentally disengaged.

It will be seen that by the particular construction shown, the whiffle-tree can be manufactured entirely of metal cheaply, is light and durable, and may be assembled by an unskilled workman, and the draft is perfectly equalized.

It is obvious that the arms $a'$, may be provided with hooks, and the connecting rod $c$, with eyes, in lieu of the particular disposition of the hooks and eyes, as herein shown.

I claim—

In a whiffle-tree, the bell-crank levers $a$, $b$, having pivot holes to receive pivot bolts which secure them to the draft frame A, the arms $a'$ of which project forward beyond the front of the draft frame, and are offset as shown and provided at their extremities with eyes $a^2$, and the arms $a^3$ of which extend inward, and upward diagonally to the draft-frame, and curved at their extremities to form hooks, and the connecting rod $c$, located in advance of the draft frame, and having hooked ends which engage the eyes $a^2$ of the forwardly projecting offset arms $a'$, of said bell-crank levers, substantially as described.

In testimony whereof I have signed my name to this specification in the presence of two subscribing witnesses.

CHARLES S. SHARP.

Witnesses:
GEO. E. CRONKRIGHT,
BURR WESTLAKE.